US011885114B2

(12) United States Patent
Bishay

(10) Patent No.: US 11,885,114 B2
(45) Date of Patent: Jan. 30, 2024

(54) POLAR ZONOHEDRON BUILDING SYSTEM CONSTRUCTED USING PRECAST CEMENT PANELS WITH INTERLOCKING SYSTEM

(71) Applicant: Shereef Bishay, Lagunitas, CA (US)

(72) Inventor: Shereef Bishay, Lagunitas, CA (US)

( * ) Notice: Subject to any disclaimer, the term of this patent is extended or adjusted under 35 U.S.C. 154(b) by 58 days.

(21) Appl. No.: 17/556,808

(22) Filed: Dec. 20, 2021

(65) Prior Publication Data

US 2022/0195716 A1 Jun. 23, 2022

Related U.S. Application Data

(60) Provisional application No. 63/128,229, filed on Dec. 21, 2020.

(51) Int. Cl.

| | |
|---|---|
| ***E04B 7/08*** | (2006.01) |
| ***E04B 1/32*** | (2006.01) |
| ***E04C 2/288*** | (2006.01) |
| ***E04B 5/02*** | (2006.01) |
| ***C04B 18/02*** | (2006.01) |
| ***C04B 28/32*** | (2006.01) |
| ***C04B 28/34*** | (2006.01) |
| ***C04B 28/18*** | (2006.01) |

(Continued)

(52) U.S. Cl.

CPC .............. *E04B 1/3211* (2013.01); *B32B 3/06* (2013.01); *B32B 5/18* (2013.01); *B32B 7/08* (2013.01); *B32B 13/02* (2013.01); *B32B 13/045* (2013.01); *C04B 18/027* (2013.01); *C04B 28/04* (2013.01); *C04B 28/188* (2013.01); *C04B 28/32* (2013.01); *C04B 28/344* (2013.01); *E04B 1/6116* (2013.01); *E04C 2/288* (2013.01); *E04C 2/50* (2013.01); *B32B 2262/067* (2013.01); *B32B 2262/101* (2013.01); *B32B 2262/108* (2013.01); *B32B 2264/101* (2013.01); *B32B 2266/0228* (2013.01); *B32B 2307/304* (2013.01); *B32B 2419/00* (2013.01); *C04B 2111/00612* (2013.01); *E04B 2001/0061* (2013.01); *E04B 2001/3276* (2013.01); *E04B 2001/3294* (2013.01); *E04B 2001/6195* (2013.01); *E04B 2103/02* (2013.01); *E04B 2103/04* (2013.01); *E04C 2002/004* (2013.01)

(58) Field of Classification Search

CPC ................................ E04B 1/3211; E04C 2/288

See application file for complete search history.

(56) References Cited

U.S. PATENT DOCUMENTS 4,075,380 A * 2/1978 Moens ................ B28B 23/0068 428/140

4,798,032 A * 1/1989 Rose, Jr. ............... E04B 1/3211 D25/13

(Continued)

*Primary Examiner* — Basil S Katcheves

(74) *Attorney, Agent, or Firm* — Jafari Law Group, Inc.

(57) ABSTRACT

The invention is a system and method for building a polar zonohedron structure from precast cement panels. The building system may include a plurality of panels configured to register with each other. Each panel includes a precast cement base with side walls enclosing a cavity within the precast cement base. The panels include at least one ridge protruding from at least one surface of a side wall of the panel and at least one aperture on at least one surface of a side wall of the panel. Each ridge is preferable configured to interlock with each aperture; in his way, the panels interlock with each other to form the polar zonohedron structure.

20 Claims, 8 Drawing Sheets

100

200

(51) Int. Cl.

| | |
|---|---|
| ***C04B 28/04*** | (2006.01) |
| ***B32B 3/06*** | (2006.01) |
| ***B32B 13/02*** | (2006.01) |
| ***B32B 7/08*** | (2019.01) |
| ***B32B 5/18*** | (2006.01) |
| ***B32B 13/04*** | (2006.01) |
| ***E04B 1/61*** | (2006.01) |
| *E04B 1/00* | (2006.01) |
| *E04C 2/00* | (2006.01) |
| *C04B 111/00* | (2006.01) |

(56) References Cited

U.S. PATENT DOCUMENTS 4,833,855 A * 5/1989 Winter, IV .............. E04C 2/288 52/591.4
4,841,702 A * 6/1989 Huettemann ............. E04B 5/04 52/794.1
4,856,248 A * 8/1989 Larson ...................... E04C 1/41 52/100
4,942,707 A * 7/1990 Huettemann ........... E04C 2/288 264/32
5,095,674 A * 3/1992 Huettemann ............. E04B 5/04 52/794.1
5,104,715 A * 4/1992 Cruz ....................... E04C 2/205 428/140
5,580,637 A * 12/1996 Konta ....................... B32B 5/18 428/137
5,596,853 A * 1/1997 Blaney .................... E04C 2/044 52/223.7
5,600,930 A * 2/1997 Drucker .................. E04C 2/288 52/794.1
5,792,552 A * 8/1998 Langkamp ................ B32B 3/28 249/176
5,803,964 A * 9/1998 Scarborough ........... E04B 1/161 106/737
5,927,032 A * 7/1999 Record ................... E04C 2/288 52/412
6,282,849 B1 * 9/2001 Tuczek ..................... E04B 1/32 52/648.1
8,827,235 B1 * 9/2014 Fisher, III ............... E04G 11/08 249/35
10,633,881 B1 * 4/2020 Sinquefield ........... E04B 1/3211
2003/0115822 A1 * 6/2003 Lejeune .................... E04B 5/04 52/309.12
2003/0208987 A1 * 11/2003 Lancelot, III ........... E04C 2/288 52/800.1
2009/0301017 A1 * 12/2009 Colon ................... E04B 2/8635 52/414
2011/0011011 A1 * 1/2011 Bjerre ..................... E04C 2/288 52/79.9
2012/0216476 A1 * 8/2012 Naidoo ................... B32B 13/02 52/794.1
2014/0083033 A1 * 3/2014 McIntosh ............ E04F 13/0885 52/302.1
2015/0047281 A1 * 2/2015 Cole ....................... E04C 2/246 52/302.1
2015/0121799 A1 * 5/2015 Imbeau ..................... E04B 1/80 52/309.4
2017/0080686 A1 * 3/2017 Rizzo ...................... E04C 2/288
2017/0121961 A1 * 5/2017 Hodson ................... E04C 2/288
2017/0191266 A1 * 7/2017 Androsiuk .............. E04C 2/296
2018/0171633 A1 * 6/2018 Nieminen ................. B32B 5/18
2019/0024360 A1 * 1/2019 Haberman ................ E04H 9/02
2019/0284804 A1 * 9/2019 Ibrahim .................... E04C 2/46
2020/0256054 A1 * 8/2020 VanHoose ............. B28B 19/003
2020/0299951 A1 * 9/2020 Drew ........................ E04H 9/10
2020/0354949 A1 * 11/2020 Roberts ................... E04G 21/16

* cited by examiner

POLAR ZONOHEDRON BUILDING SYSTEM CONSTRUCTED USING PRECAST CEMENT PANELS WITH INTERLOCKING SYSTEM

PRIORITY NOTICE

The present application claims priority to U.S. Provisional Patent Application with Ser. No. 63/128,229, filed on Dec. 21, 2020, the disclosure of which is incorporated herein by reference in its entirety.

TECHNICAL FIELD OF THE INVENTION

This invention relates to building structures and, more particularly, to a structural system utilizing the polar zonohedron geometry using precast cement panels with an interlocking system.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The popularity and widespread use of domes has risen in recent years. Geodesic domes are widely used for residential homes, green houses, warehouses, water reservoirs and entertainment spots. Geodesic domes are one of the most familiar features in architecture, frequently used for government and religious buildings.

A typical dome has a hemispherical structure on a polyhedron. A dome structure is typically formed from numerous lightweight interlocking polygon-shaped bodies. Although the overall shape of the dome is spherical, the individual bodies are often flat panels. Many dome designs make use of triangle-shaped panels. The panels may be joined by wire mesh to form a dome, or assembled within elongated rods which form the hemispherical structure.

Unfortunately, for some panels it's challenging to maintain interlocking efficiently during the dome construction. Traditional dome construction using lumber, plywood, shingles and difficult to maintain, and difficult to make waterproof. Also, it may result in less structural strength and more waste material during construction. Many dome constructions require internal support frameworks to properly support the structure. This leads to increased construction costs in terms of the excessive time and effort required for assembly as well as the increased material costs, and therefore reduces the desirability of the structure. Hence, it is advisable to use the desired size and shape of the panel along with suitable interlocking mechanism in order to complete the construction of the dome without excessive time and efforts to assemble. It is also advisable to make use of ceramic cement to enable pre-casting of extremely strong and waterproof panels.

It is to these ends that the present invention has been developed.

SUMMARY OF THE INVENTION

To minimize the limitations in the prior art, and to minimize other limitations that will be apparent upon reading and understanding the present specification, the present invention describes a system for building a polar zonohedron structure.

Generally, the invention is a system and method for building a polar zonohedron structure from precast cement panels. The building system may include a plurality of panels configured to register with each other. Each panel includes a precast cement base with side walls enclosing a cavity within the precast cement base. The panels include at least one ridge protruding from at least one surface of a side wall of the panel and at least one aperture on at least one surface of a side wall of the panel. Each ridge is preferable configured to interlock with each aperture; in his way, the panels interlock with each other to form the polar zonohedron structure.

According to some aspects of the present invention, a building system is provided for building a polar zonohedron structure. The building system, in accordance with some exemplary embodiments of the present invention, may include a plurality of panels configured to register with each other to form a polar zonohedron structure, each of the plurality of panels comprising a precast cement base with side walls enclosing a cavity within the precast cement base; at least a first panel of the plurality of panels including at least one ridge protruding from at least one surface of a side wall of the first panel; and at least a second panel of the plurality of panels including at least one aperture on at least one surface of a side all of the second panel; wherein the ridge protruding from the surface of the first panel interlocks with the aperture on the surface of the second panel and each of the plurality of panels are interlocked to form the polar zonohedron structure.

In some embodiments, each of the precast cement base of each of the plurality of panels comprises a quadrilateral shape with a first set of two adjacent walls having adjacent protruding ridges and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel.

In some exemplary embodiments, a building system may include a plurality of panels configured to register with each other to form a polar zonohedron structure; at least a first panel from the plurality of panels including a first ridge protruding from a surface of a side wall of the first panel; and at least a second panel from the plurality of panels, interlocked with the first panel, the second panel including a first aperture on a surface of a side all of the second panel; wherein one or more of the plurality of panels comprise of: a quadrilateral precast cement base with walls enclosing a cavity within the precast cement base; a first set of two adjacent walls having adjacent protruding ridges; and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel; and wherein each of the plurality of panels are interlocked to form the polar zonohedron structure.

In some embodiments, the system may further comprise of an insulation layer situated inside the cavity of the precast cement base of each of the plurality of panels.

In some embodiments, the system may further comprise of a nailer sandwiching the insulation layer against an interior of the precast cement base of each of the plurality of panels.

In some embodiments, the system may further comprise of an interior finished surface coupled to the nailer, the interior finished surface at least partially sealing the cavity of the precast cement base of each of the plurality of panels.

In some embodiments, each panel may comprise an insulation layer situated inside the cavity of the precast cement base; a nailer sandwiching the insulation layer against an interior of the precast cement base; and an interior finished surface coupled to the nailer, the interior finished surface at least partially sealing the cavity of the precast cement base.

In some embodiments, a cement for the precast cement base comprises at least one or more of: magnesium phosphate, magnesium sulfoaluminate, magnesium oxysulfate, magnesium oxychloride, magnesium sulphate, magnesium phosphate, calcium silicate, any magnesium-based cement, or portland cement. In some embodiments, the cement for the precast cement base may be a light filler. In some embodiments, the light filler may include perlite, expanded glass, pumice, protonated foam and wollastonite.

In some embodiments, the system may further comprise of a insulation layer that is a foam insulation. In some embodiments, the foam insulation includes one or more of: expanded polystyrene (EPS), basalt, extruded polystyrene (XPS), rockwool, wood fiber, fiber glass, perlite, or an insulation fill.

In some embodiments, an interior finished surface of one or more panels is removably coupled to a portion of the panel in order to facilitate access to an electrical system of the structure. In some embodiments, each ridge includes two protruding angular projections and aperture of each panel is curved.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
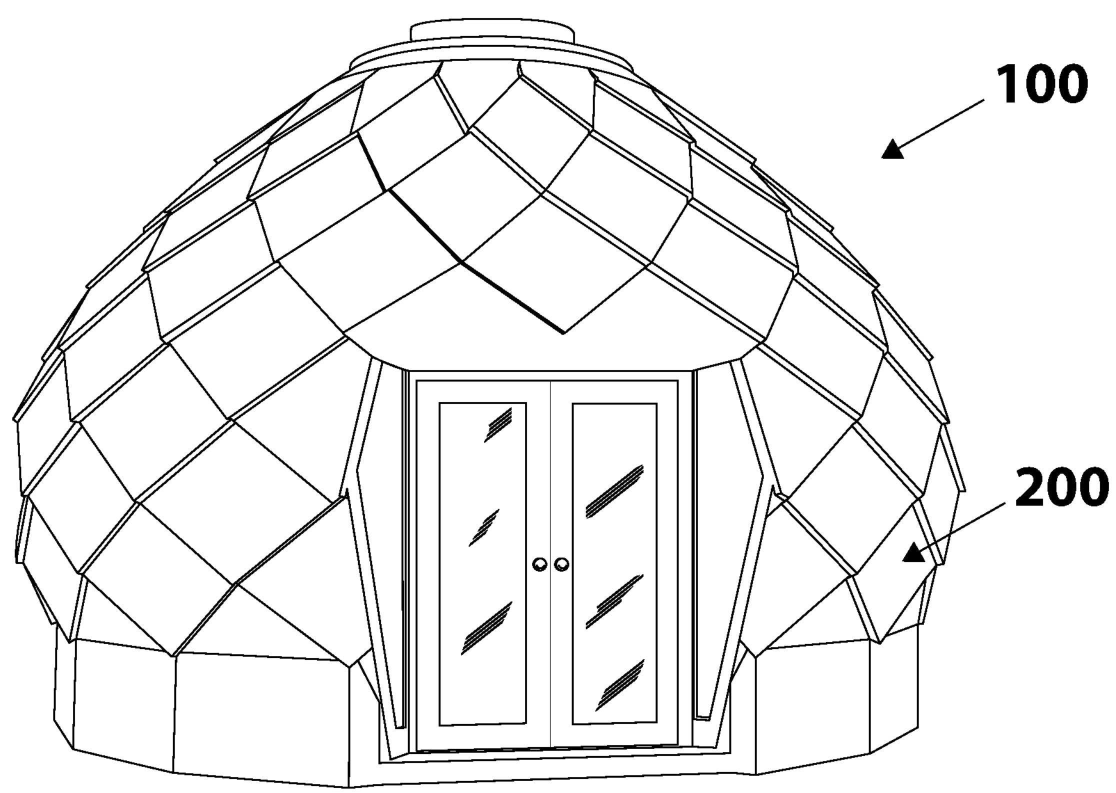
FIG. 1 illustrates a perspective view of a polar zonohedron building structure constructed using a precast cement panel.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

An aspect of the specification provides a building system of a polar zonohedron geometry. The building system is constructed using a panel with an interlocking system. The panel is designed to include a precasting of cement base, a wood nailer, a foam insulation and a removable interior finish face of a white oak plywood. The panel is further designed to include an interlocking system for ease of connecting of two panels together during construction.

It is an object of the present invention to provide a construction that can be assembled using a minimal number of identical panels, i.e., reduce the number of different parts required. It is a further object of the present invention to provide a means to easily join the panels of the structure together, so that minimal effort is required for assembly. An advantage of the present invention is that it is very simple to construct with natural composite ceramic and is 100% nontoxic and chemical free with low embodied co2. Another advantage of the present invention is that the structure of the panels eliminates the waste of the material. A further advantage of the present invention is that the interlocking means allow the structure to be assembled efficiently with snug fit. A still further advantage of the present invention is to provide efficient water proofing to the building system.

FIG. 1 illustrates a perspective view of a polar zonohedron building structure 100 constructed using a panel 200. As illustrated, a polar zonohedron building structure 100 further includes the several panel 200 of definite shape and size. The panel 200 is configured to be installed with each other to form the polar zonohedron building structure. The polar zonohedron geometry of the building structure 100 allows stress from the weight load of the panels 200 to be efficiently transferred to the ground. The shape of panel 200 also makes it possible to fit the several panels together during the construction. This not only maximizes the strength of the structure, but is very aesthetically pleasing as well.

Figure 2:
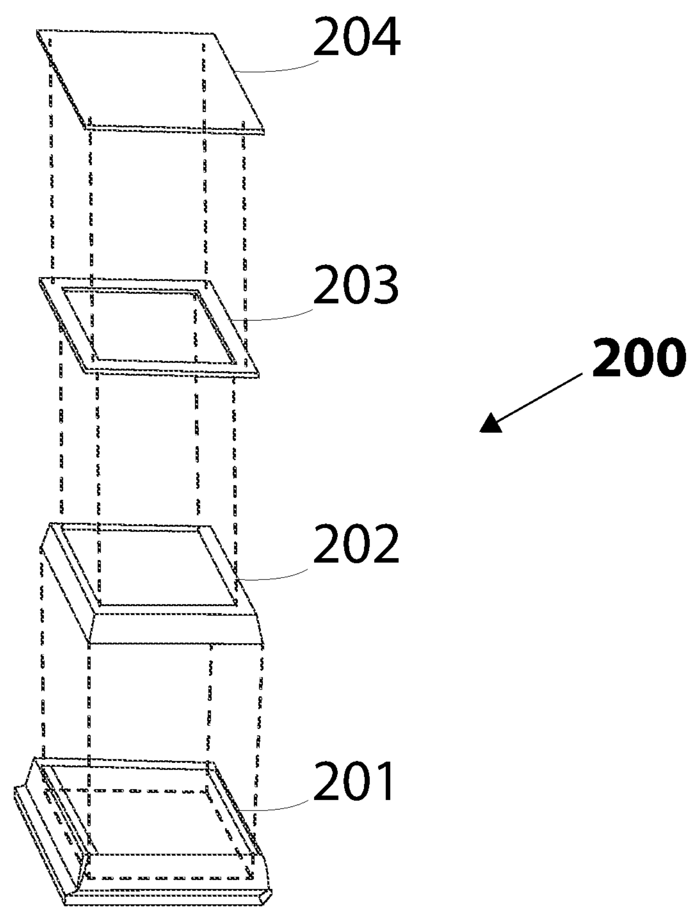
FIG. 2 is an exploded view illustrating the internal structure of a panel in accordance with some embodiments.

FIG. 2 is an exploded view illustrating the internal structure of the panel 200 in accordance with some embodiments. As illustrated, the panel 200 further includes a precasting of a cement base 201, a foam insulation 202, a wood nailer 203 and an interior finish face 204. The process of designing the panel 200 includes pouring of multiple layers of a cement 201 into a mold at various levels of density. This step is generally referred to as precasting of the panels 200. Precasting of panel 200 is configured for structurally strong and well-insulated building systems.

The precast cement 201 can be selected from a group consisting of but not limited to magnesium phosphate, magnesium sulfoaluminate, magnesium oxysulfate, magnesium oxychloride, magnesium sulphate, magnesium phosphate, calcium silicate, other magnesium-based cement, portland cement or other lightweight cements. The precast cement 201 may or may not be mixed with a light filler. The light filler may be selected from but not limited to a group consisting of perlite, expanded glass, pumice, protonated foam and wollastonite.

The precast cement 201 is further processed to receive the foam insulation 202. The foam insulation 202 is designed to be rigid in nature to maintain the core strength of the panel 200. The foam insulation 202 is made up of but not limited to expanded polystyrene (EPS), basalt, extruded polystyrene (XPS), rockwool, wood fiber, fiber glass, perlite and other suitable insulation fill. The wood nailer 203 is further designed to provide a means of attaching the foam insulation 202 and precast magnesium based ceramic cement 201. The panel 200 further includes the interior finish face 204. The interior finish face 204 can be made of but not limited to the wooden material such as white oak plywood.

Figure 3:
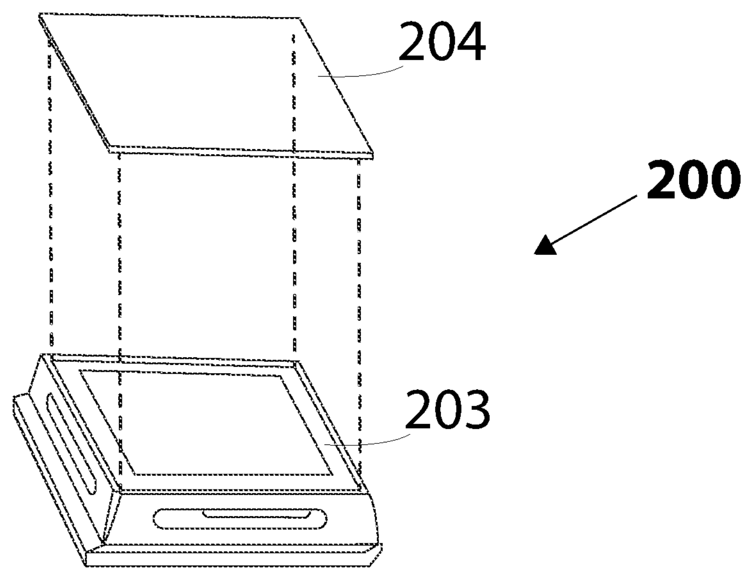
FIG. 3 is a top perspective view illustrating a panel with a removable interior finish face in accordance with some embodiments.

FIG. 3 is a top perspective view illustrating a panel with a removable interior finish face in accordance with some embodiments. The interior finish face 204 is designed to removably attach and fits within the wood nailer 203. The interior finish face 204 is further configured to remove from the panel 200 to run the electric and other utilities within the panel 200.

In some embodiments, each of the precast cement base of each of the plurality of panels comprises a quadrilateral shape with a first set of two adjacent walls having adjacent protruding ridges and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel.

Figure 4:
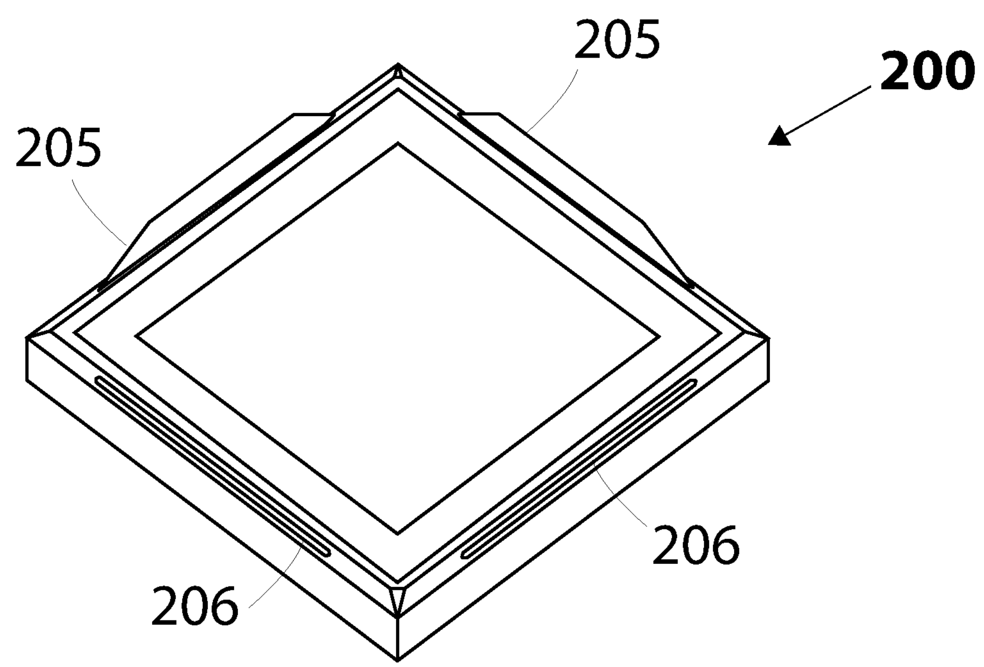
FIG. 4 is a top sectional view illustrating a panel with a ridge and groove in accordance with some embodiments.

FIG. 4 is a top view illustrating the inner side of the panel 200 including one of the interlocking systems a tongue or ridge 205 and groove 206 in accordance with some embodiments. Each panel 200 further includes a pair of ridge 205 on adjacent sides of the panel 200 and a pair of grooves 206 on another adjacent side of the panel 200. The ridge 205 is designed to include two protruding angular projections 205 that extend into an opening to form receiving the pair groove 206. The pair of grooves 206 is designed to be curved to form a receiving aperture to receive the pair ridge 205. Both pair of ridge 205 and groove 206 is configured to facilitate interlocking mechanism to snugly fit into the other panel 200 during the construction of the polar zonohedron building system 100. The tongue and groove interlocking system may be designed to be replaced by other interlocking methods such as but not limited to plurality of hubs join a plurality of panels, cement, cement glue, other construction adhesives, construction joint, masonry anchors and mortar.

In some exemplary embodiments of the present invention, a building system may include: a plurality of panels 200 configured to register with each other to form a polar zonohedron structure 100, each of the plurality of panels 200 comprising a precast cement base 201 with side walls enclosing a cavity within the precast cement base 201; at least a first panel of the plurality of panels including at least one ridge 205 protruding from at least one surface of a side wall of the first panel; and at least a second panel of the plurality of panels including at least one aperture 206 on at least one surface of a side all of the second panel; wherein the ridge protruding from the surface of the first panel interlocks with the aperture on the surface of the second panel and each of the plurality of panels are interlocked to form the polar zonohedron structure.

In some exemplary embodiments, a building system may include a plurality of panels 200 configured to register with each other to form a polar zonohedron structure; at least a first panel from the plurality of panels 200 including a first ridge 205 protruding from a surface of a side wall of the first panel; and at least a second panel from the plurality of panels, interlocked with the first panel, the second panel including a first aperture 206 on a surface of a side all of the second panel; wherein one or more of the plurality of panels comprise of: a quadrilateral precast cement base 201 with walls enclosing a cavity within the precast cement base 201; a first set of two adjacent walls having adjacent protruding ridges; and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel; and wherein each of the plurality of panels are interlocked to form the polar zonohedron structure 200.

Figure 5:
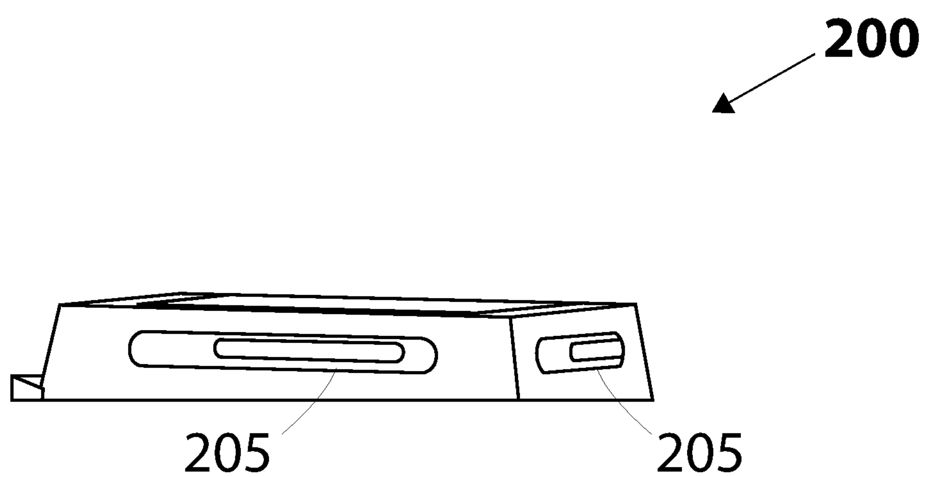
FIG. 5 is a side perspective view illustrating a panel facing a ridge in accordance with some embodiments.

FIG. 5 is a side perspective view illustrating the panel 200 facing the pair of ridge 205 in accordance with some embodiments. As illustrated, the pair of ridge 205 is installed on to the adjacent sides of the panel 200.

Figure 6:
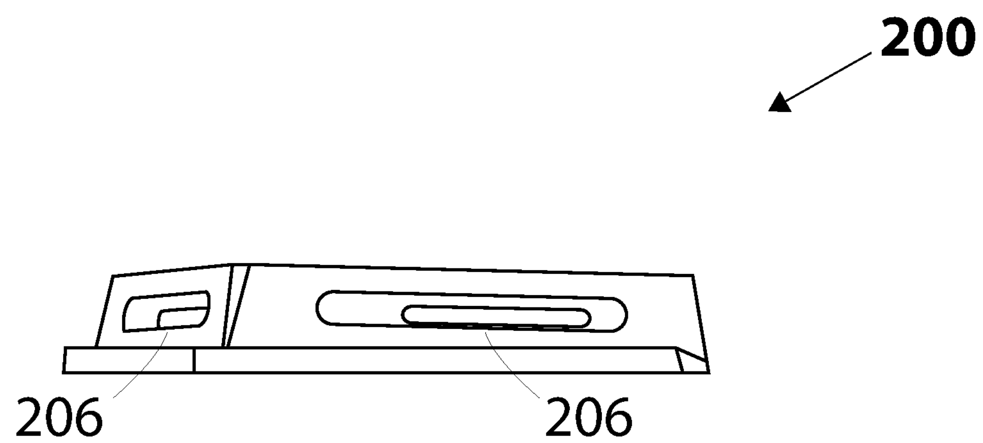
FIG. 6 is a top perspective view illustrating a panel facing a groove in accordance with some embodiments.

FIG. 6 is a top perspective view illustrating the panel 200 facing the pair of grooves 206 in accordance with some embodiments. As illustrated, the pair of grooves 206 is installed on to the adjacent sides of the panel 200.

Figure 7:
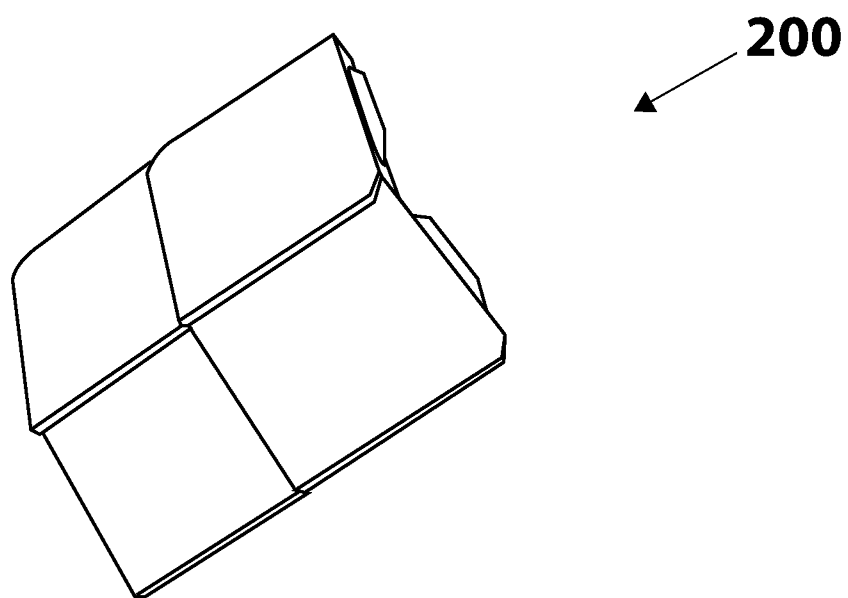
FIG. 7 is an outer perspective view illustrating the attachment of the two or more panels in accordance with some embodiments.

FIG. 7 is an outer perspective view illustrating the attachment of the two or more panels 200 in accordance with some embodiments. As illustrated, the panels 200 are interlocking with each other panels with the help of the pair of ridge 205 and grooves 206.

Figure 8:
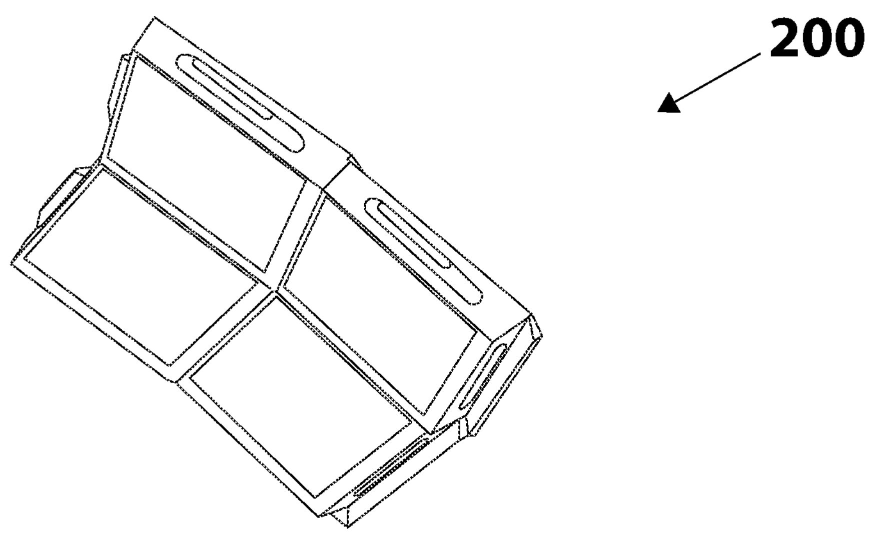
FIG. 8 is an inner perspective view illustrating the attachment of the two or more panels in accordance with some embodiments.

FIG. 8 is an inner perspective view illustrating the attachment of the two or more panels 200 in accordance with some embodiments. As illustrated, the panels 200 are interlocking with each other panels with the help of the pair of ridge 205 and grooves 206.

As used herein, "interlocking" refers to (of two or more things) having parts that overlap or fit together. The term "grooves" usually refers to a long, narrow cut or depression, especially one made to guide motion or receive a corresponding ridge. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a nonexclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

All references, including but not limited to patents, patent applications, and nonpatent literature are hereby incorporated by reference herein in their entirety.

A polar zonohedron building system constructed using precast cement panels with interlocking system has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A polar zonohedron building system using precast cement panels with interlocking system, comprising:

a plurality of panels configured to register with each other to form a polar zonohedron structure, each of the plurality of panels comprising a cement base with side walls enclosing a cavity within the cement base;

at least a first panel of the plurality of panels including at least one ridge protruding from at least one surface of a side wall of the first panel; and at least a second panel of the plurality of panels including at least one aperture on at least one surface of a side all of the second panel;

wherein the ridge protruding from the surface of the first panel interlocks with the aperture on the surface of the second panel and each of the plurality of panels are interlocked to form the polar zonohedron structure.

2. The polar zonohedron building system of claim 1, wherein each of the cement base of each of the plurality of panels comprises a quadrilateral shape with a first set of two adjacent walls having adjacent protruding ridges and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel.

3. The polar zonohedron building system of claim 2, further comprising an insulation layer situated inside the cavity of the cement base of each of the plurality of panels.

4. The polar zonohedron building system of claim 3, further comprising a nailer sandwiching the insulation layer against an interior of the cement base of each of the plurality of panels.

5. The polar zonohedron building system of claim 4, further comprising an interior finished surface coupled to the nailer, the interior finished surface at least partially sealing the cavity of the cement base of each of the plurality of panels.

6. The polar zonohedron building system of claim 2, wherein the insulation layer comprises a foam insulation.

7. The polar zonohedron building system of claim 1, wherein a cement for the cement base comprises at least one or more of: magnesium phosphate, magnesium sulfoaluminate, magnesium oxysulfate, magnesium oxychloride, magnesium sulphate, magnesium phosphate, calcium silicate, any magnesium-based cement, or portland cement.

8. The polar zonohedron building system of claim 7, wherein the cement for the cement base further comprises a light filler.

9. The polar zonohedron building system of claim 8, wherein the light filler comprises: perlite, expanded glass, pumice, protonated foam and wollastonite.

10. The polar zonohedron building system of claim 9, wherein the foam insulation includes one or more of: expanded polystyrene (EPS), basalt, extruded polystyrene (XPS), rockwool, wood fiber, fiber glass, perlite, or an insulation fill.

11. A polar zonohedron building system using precast cement panels with interlocking system, comprising:

a plurality of panels configured to register with each other to form a polar zonohedron structure;

at least a first panel from the plurality of panels including a first ridge protruding from a surface of a side wall of the first panel; and at least a second panel from the plurality of panels, interlocked with the first panel, the second panel including a first aperture on a surface of a side all of the second panel;

wherein one or more of the plurality of panels comprise of:

a quadrilateral cement base with walls enclosing a cavity within the cement base;

a first set of two adjacent walls having adjacent protruding ridges; and a second set of two adjacent walls having adjacent apertures, wherein each of the adjacent apertures is adapted to receive the ridge protruding from the surface of the first panel, and each of the adjacent protruding ridges is adapted to register within the aperture on the surface of the second panel; and wherein each of the plurality of panels are interlocked to form the polar zonohedron structure.

12. The polar zonohedron building system of claim 11, further comprising:

an insulation layer situated inside the cavity of the cement base;

a nailer sandwiching the insulation layer against an interior of the cement base; and an interior finished surface coupled to the nailer, the interior finished surface at least partially sealing the cavity of the cement base.

13. The polar zonohedron building system of claim 12, wherein the insulation layer comprises a foam insulation.

14. The polar zonohedron building system of claim 13, wherein the foam insulation includes one or more of: expanded polystyrene (EPS), basalt, extruded polystyrene (XPS), rockwool, wood fiber, fiber glass, perlite, or an insulation fill.

15. The polar zonohedron building system of claim 12, wherein the interior finished surface is removably coupled to a portion of the panel.

16. The polar zonohedron building system of claim 11, wherein a cement for the cement base comprises at least one or more of: magnesium phosphate, magnesium sulfoaluminate, magnesium oxysulfate, magnesium oxychloride, magnesium sulphate, magnesium phosphate, calcium silicate, any magnesium-based cement, or portland cement.

17. The polar zonohedron building system of claim 16, wherein the cement for the cement base further comprises a light filler.

18. The polar zonohedron building system of claim 17, wherein the light filler comprises: perlite, expanded glass, pumice, protonated foam and wollastonite.

19. The polar zonohedron building system of claim 11, wherein each ridge includes two protruding angular projections.

20. The polar zonohedron building system of claim 11, wherein the pair of adjacent apertures are curved.

* * * * *